Feb. 24, 1953     D. R. CORRADO     2,629,174
GLASS CUTTING GAUGE AND BREAKER
Filed Sept. 28, 1951
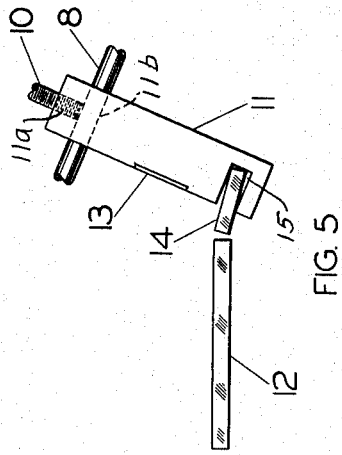
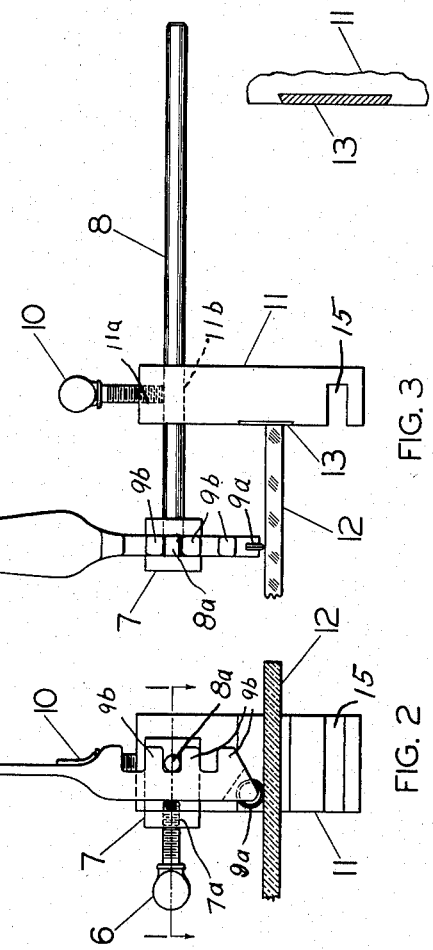
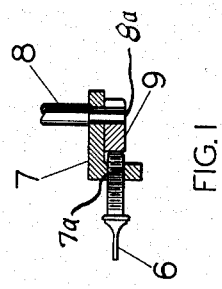
INVENTOR.
Domenic R. Corrado
BY
H. G. Manning

UNITED STATES PATENT OFFICE 2,629,174

GLASS CUTTING GAUGE AND BREAKER

Domenic R. Corrado, Torrington, Conn.

Application September 28, 1951, Serial No. 248,812

2 Claims. (Cl. 33—42)

This invention relates to manually-operated glass cutting tools and more particularly to a glass cutting gauge and breaker which will minimize the time required for cutting and severing a strip from a sheet of glass.

One object of the present invention is to provide a guide for a conventional glass cutting tool to facilitate the scratching of a breaking line at a predetermined distance parallel to one edge of a sheet of glass.

A further object is to provide a device of the above nature in which the glass cutting gauge may be adjustably clamped in any desired operating position with respect to the cutting tool.

Another object is to provide a glass cutting gauge having an associated breaker slot conveniently located near the bottom thereof in such a position as to reduce the motions and time required to perform the complete job of cutting and breaking strips from a glass sheet.

A further object is to provide a device of the above nature which will be simple in construction, inexpensive to manufacture, easy to install and manipulate, compact, ornamental in appearance, and very efficient and durable in use.

With these and other objects in view there has been illustrated on the accompanying drawing one form in which the invention may conveniently be embodied in practice.

In the drawing:

Fig. 1 illustrates a cross-sectional view of the angle bracket cutter tool and guide rod—the section being taken along the line 1—1 of Fig. 2.

Fig. 2 is an end view of the gauge and breaker as it appears in use while cutting a sheet of glass with a conventional glass cutter clamped in operating position in the gauge tool.

Fig. 3 is a side view of the same.

Fig. 4 is a fragmentary end view of the gauge block with a section taken through the wear plate.

Fig. 5 is a side view of the gauge block as it appears, in an inclined position, when a strip of glass is being broken from the edge of a glass sheet by the cutting gauge and breaker tool of this invention.

Referring now to the drawing, in which like reference numerals denote corresponding parts throughout the several views, the numeral 6 indicates a flat-headed horizontal set screw adapted to be secured in a tapped hole 7a in the short leg of an angle bracket 7.

In order to cut or "score" a line adjacent the edge of a sheet of glass 12, provision is made of a conventional vertical glass cutter shank 9 having a cutting wheel 9a at the bottom thereof and being provided with a plurality of horizontal, vertically spaced teeth 9b in the enlarged bottom end of the tool.

The notches between the spaced teeth 9b may selectively be secured around the reduced cylindrical end 8a of the rod 8, depending upon the desires of the user.

After the tool has been secured in the desired notch, the thumb set screw 6 will be turned tightly against the rear wall of the cutter tool as shown in Fig. 2, to lock said tool tightly upon the rod 8.

Provision is also made of a rectangular gauge block 11 having a tapped hole 11a in its upper end communicating with a drilled hole 11b within which the guide rod 8 is slidably fitted. A vertical thumb set screw 10 is adapted to be driven into the tapped hole 11a for tightly clamping against the rod 8 to hold the latter in adjusted position according to the desired width of cut on the glass sheet 12.

In order to minimize wear and enable the tool to be used for a long period of time, provision is made of a stainless steel wear plate 13, located on the gauge block 11 in alignment with the location of the edge of the sheet of glass 12.

In order to permit a strip 14 of glass to be severed from the glass sheet 12 (after the score line has been cut thereon by the cutting tool 9) provision is made of a rectangular slot 15 located in the inner edge of the gauge block 11 adjacent the bottom end thereof.

Operation

In operation, after cutting or scoring the line adjacent the edge of the glass sheet 12, it will be a simple matter to insert the edge of said glass sheet within the slot 15 of the block 11, and twist said block to the inclined position shown in Fig. 5, so as to break off the entire length of the glass strip 14 from said sheet 12.

One advantage of the present invention is that it will permit the very rapid cutting and severing of narrow edge strips 14 successively from the edge of a large sheet of glass 12, thus greatly facilitating the work of a glazier.

For example, it has been found that a box of 23 sheets of 16" x 20" glass may be cut into ⅜" strips and severed from said sheets in less than three (3) minutes, as compared to at least thirty (30) minutes required by the old system.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a glass cutting tool, a vertical gauge block having a horizontal drilled hole near the top thereof, a vertical tapped hole extending into the top of said gauge block and communicating with said drilled hole, a horizontal elongated guide rod loosely fitted within said drilled hole, a thumb set screw in said tapped hole for clamping said rod in any desired adjusted position, an angle bracket secured rigidly upon the end of said rod, and a thumb set screw passing through said angle bracket for detachably engaging the outer smooth edge of a standard glass cutting tool, the end of said guide rod having a reduced section adapted to be detachably fitted within the notch between adjacent teeth on the inner edge of said glass cutting tool.

2. The invention as defined in claim 1, in which the vertical wall of said block is provided with a wear plate to minimize the frictional wear upon said block by the sharp edge of the glass being cut.

DOMENIC R. CORRADO.

No references cited.